United States Patent
King

(10) Patent No.: US 7,334,111 B2
(45) Date of Patent: Feb. 19, 2008

(54) METHOD AND RELATED DEVICE FOR USE IN DECODING EXECUTABLE CODE

(75) Inventor: Colin I. King, Crawley (GB)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 10/585,801

(22) PCT Filed: Jan. 11, 2005

(86) PCT No.: PCT/IB2005/050122

§ 371 (c)(1),
(2), (4) Date: Jul. 12, 2006

(87) PCT Pub. No.: WO2005/069124

PCT Pub. Date: Jul. 28, 2005

(65) Prior Publication Data

US 2007/0162725 A1    Jul. 12, 2007

(30) Foreign Application Priority Data

Jan. 13, 2004    (GB) ................................. 0400660.7

(51) Int. Cl.
*G06F 9/30* (2006.01)
(52) U.S. Cl. ..................................... 712/213; 712/208
(58) Field of Classification Search ................ 712/208, 712/213
See application file for complete search history.

(56) References Cited

U.S. PATENT DOCUMENTS 5,862,398 A * 1/1999 Hampapuram et al. ....... 712/24
6,131,152 A * 10/2000 Ang et al. ..................... 712/24
6,745,319 B1 * 6/2004 Balmer et al. .............. 712/223

FOREIGN PATENT DOCUMENTS

| WO | WO 94/27216 | * 11/1994 |
| WO | WO 97/43715 A | * 11/1997 |

OTHER PUBLICATIONS

Conte et al., "Instruction Fetch Mechanisms for VLIW Architectures with Compressed Encodings", Proceedings of the 29th Annual IEEE/ACM International Symposium on Microarchitecture, 1996. MICRO-29, Dec. 2-4, 1996, pp. 201-211.*

Larin et al., "Complier-driven cached code compression schemes for embedded ILP processors", Proceedings. 32nd Annual International Symposium on Microarchitecture, 1999. MICRO-32, Nov. 1999, pp. 82-92.*

* cited by examiner

*Primary Examiner*—William M. Treat

(57) ABSTRACT

The invention provides for a method and related device and control program for use in decoding executable code in a processing system, for example run-time operating system, including bit-shuffling code at run-time, and including the steps of dividing the code into a plurality of sub-portions, identifying sub-portions of the code that can be bit-shuffled prior to the said run-time and bit-shuffling the said identified sub-portions prior to run-time so as to reduce the bit-shuffling required at run-time.

29 Claims, 2 Drawing Sheets

US 7,334,111 B2

METHOD AND RELATED DEVICE FOR USE IN DECODING EXECUTABLE CODE

Figure 1:
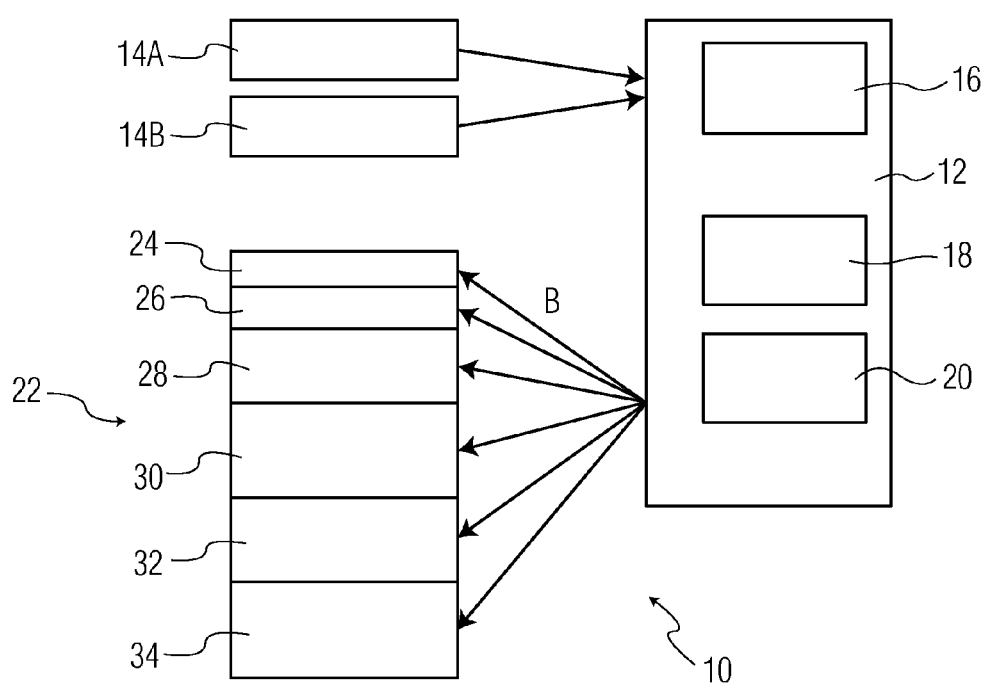

The present invention relates to a method and related device for use in decoding executable code in processors such as VLIW processors and in particular in a run-time operating system for use, in particular, for the loading and relocation of processor executables in memory.

With the increased adoption of multimedia processing powerful processors have been developed capable of supporting large and complex multimedia applications.

Before an executable relating to such an application can be run, it is necessary for the executable image to be loaded into memory and subsequently relocated. Such relocation is a process of binary-patching such that references to addresses in the executable are matched to the actual loaded address space. References to such addresses can commonly comprise start addresses of decision trees in the executable text segment, or data addresses in the data, data1 or bss segments.

The TriMedia processor available from Philips is an example of a VLIW processor. TriMedia executables are examples of such codes as discussed above and subsequent to the patching of the executable, the text segment containing the TriMedia executable code has to be bit-shuffled in order to allow the processor to decode the executable in a cache-efficient manner, specifically at run-time. However, such bit-shuffling comprises a memory-intensive, and computationally expensive operation and is also found to be proportional to the size of the program being loaded.

When loading an executable from memory, such as from a cached file system for example, it is found that the aforementioned bit-shuffling operation forms a major component of the load-time experienced.

In run-time operating systems, such as where it is required that executables be loaded frequently, or where large statically linked programs are to be loaded, such bit-shuffling operations are considered to represent considerable restraints on performance.

The present invention seeks to provide for a method and related device for use in decoding executable code in a run-time operating system and which exhibits advantages over known such methods and devices.

According to a first aspect of the present invention there is provided a method for use in decoding executable code in a processing system including bit-shuffling code, and including the steps of: dividing the code into a plurality of sub-portions; identifying sub-portions of the code that can be bit-shuffled prior to processing; and bit-shuffling the said identified sub-portions prior to processing so as to reduce the processing bit-shuffling required.

The invention can advantageously be applied to processing stages on pre-shuffled binaries, for example linking pre-shuffled binary object code during a later link time phase.

In one particular arrangement the processing system comprises a run time operating system and involving bit shuffling at run time and the identification of sub-portion that can be bit shuffled prior to run time.

Advantageously the pre-shuffling of the said a portion of the code can lead to a reduction in the run-time shuffling delays within the order of 20-25% and this advantageously serves to increase the executable load and relocate time.

Improved run-time performance can therefore be achieved and it will be appreciated that the invention proves particularly advantageous when handling TriMedia programs and executables.

Advantageously, the method includes the step of, at link time, generating a relocation patch-up table for the loading and relocation of the code.

Further, the relocation patch-up table is examined at the end of the aforesaid linking so as to determine which addresses in the code are patched.

Preferably, the method includes the step of generating a record of the sub-portions to be patched and shuffled at run-time in the form of a bitmap.

The invention may also include the step of reading code elements within a program loader for the execution of the program.

Then, the program loader can be arranged to read the relocation patch-up table and the executable code and write the result back within the executable code.

According to another aspect of the present invention there is provided decoding apparatus for decoding executable code in a processor and including means for bit-shuffling code, the apparatus further comprising: means for dividing the code into a plurality of sub-portions; means for identifying sub-portions of the code that can be bit-shuffled prior to processing; and means for bit-shuffling the said identified sub-portions prior to processing so as to reduce the processing bit-shuffling required.

Advantageously the processor comprises a run-time operating system.

Preferably the application includes means for generating a relocation patch-up table for the loading and relocation of the code at link time.

Further, the invention can include means for bit-shuffling the identified sub-portions at link time.

Preferably means for generating a record of the sub-portions to be patched and shuffled at run-time in the form of a bitmap are provided.

In one embodiment a program loader is included and arranged to read the relocation patch-up table and the executable code and to write the result back within the executable code.

The invention also provides for a computer program element and product for the control of such decoding and for the provision of such method steps as outlined above.

Figure 2:
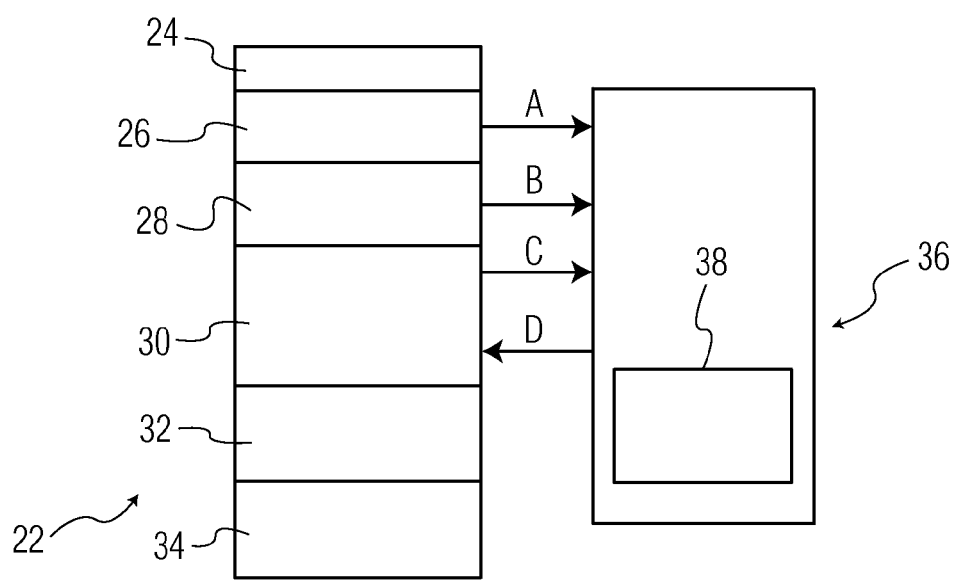

The invention is described further hereinafter, by way of example only, with reference to the accompanying drawings in which:

FIG. 1 comprises a schematic block diagram illustrating the generation of the program executable image in accordance with an embodiment of the present invention;

FIG. 2 is a schematic block diagram illustrating the loading and relocating of the program executable image of FIG. 1.

As will be appreciated from the above-mentioned definition of the present invention, the bit-shuffling operation is advantageously manipulated such that the shuffling operation is conducted against sub-portions of the code, which sub-portions advantageously comprise cache-sized blocks. For example, for use in TriMedia processing, in particular with the TriMedia 1300, the code can be broken down into instruction cache-sized blocks in the form of 64 byte blocks.

Through adoption of the present invention, it is found that in the order of 75-80% of the cache-sized blocks in an executable image require patching and bit-shuffling at run-time. As will be appreciated, this leaves 20-25% that are not patched and so, as determined by the present invention, can be bit-shuffled prior to run-time and, in particular, when the program is being linked to form the executable image.

Thus, as noted, such pre-shuffling of non-patched 64 byte blocks advantageously serves to reduce the run-time shuffling overhead commonly experienced by 20-25% leading to an advantageous increase in the executable load and relocate time.

As noted, the invention advantageously provides for the bit-shuffling prior to run-time and as the program is being linked. At link time, therefore, the linker is advantageously arranged to generate a relocation patch-up table for the loading and relocation of the executable at run-time.

At the end of such linking, the linker is arranged to examine the relocation patch-up table to determine which addresses in the text segment are then patched. Through identification of such patched segments, it is readily identified which of the 64 byte blocks need to be patched and shuffled at run-time.

The 64 byte blocks that are not affected by patching are then pre-shuffled at link time and a record of which blocks are to be patched and shuffled at run-time is generated by the linker in the form of a bitmap which is advantageously added to the executable image.

Such a bitmap can advantageously be arranged with each single bit representing a 64 byte block in the executable text segment. Each bit in the bitmap then acts as a flag readily identifying for the loader whether or not to bit-shuffle the particular 64 byte block associated with it. Thus, the Nth bit in the bitmap represents the Nth 64 byte block in the executable text segment.

For an N-byte executable text segment therefore, (N+63)/64 bits in a bit map are required. With 8 bit bytes, this adds just (N+63)/512 bytes to the overall executable.

Turning now to FIG. 1 there is illustrated, in schematic block form, an arrangement according to the present invention for producing a program executable image having pre-shuffled portions of code.

The arrangement 10 illustrated in FIG. 1 includes a program linker 12 arranged to read object files 14A, 14B so as to link the objects together and thereby form the required program executable image.

In accordance with this illustrated embodiment of the present invention, and during the linking process, a table 16 of the addresses of the text segment to be patched is formed within the linker 12 and a 64 byte block of the text segment not requiring patching at run-time is then pre-shuffled by a Text Segment Pre-Shuffler 20 through reference to the table 16 of text segment patch addresses 18.

Upon completion of this process, the executable 22 can then be read out in the directions of arrows B and contains a executable header 24 for example an a.out or ELF header, a shuffle bitmap 26 indicating which 64 byte blocks of the text segment that remain need shuffling at run-time, a relocation patch-up table 28 arranged to patch the text and data segments at run-time, text and data segments 30, 32 and a BSS segment 34.

Turning now to FIG. 2, it will be appreciated how the executable 22 illustrated in FIG. 1 is advantageously loaded as required.

The executable 22 includes the same segments as noted above, in particular the shuffle bit-map 26, the relocation patch-up table 28 and the text segment 30 are identified for ease of reference.

The loading and relocating of the TriMedia executable text segment proceeds as follows.

A program loader 36 is arranged for reading the relocation patch-up table and shuffle bit-map and executable text code as indicated by way of arrows B and C, from the executable image 22 and serves to relocate the image and write this back as relocated text segment 30 as indicated by means of arrow D.

The program loader 36 then reads the shuffle bitmap bit by bit as indicated by arrow A and this determines if each 64 byte block of the text segment needs to be shuffled by a text segment shuffler 38 found within the program loader 36. If it is identified that the segment being considered requires shuffling, the text segment shuffler 38 can read the 64 byte block from the text segment as indicated by arrow C and then shuffle it, and write it back, as indicated by arrow D.

As will be appreciated, the advantages offered by the present invention are applicable for use with any executable code required within a run-time operating system such as TriMedia executable code that has to be loaded and relocated before execution.

The invention applies not only to program executables but also to runnable libraries, such as TriMedia dynamic link libraries (DLL's).

As will be appreciated, the loading of programs and libraries is generally undertaken either by loader library, for example in a pSOS real time operating system, or by a binary loader function such as in monolithic kernels in UNIK-like operating systems such as Linux, or real-time operating systems. It will therefore be appreciated that a particularly advantageous use of the present invention is with an operating system that has to load and relocate TriMedia executable code.

The invention is not restricted to the details of the foregoing embodiment. In particular the concept is not restricted to use with a run-time operation system but is equally applicable to, for example, processing stages on pre-shuffled binaries such as listing pre-shuffled binary object code during a later link time phase.

The invention claimed is:

1. A method for use in decoding executable code in a processor system including bit-shuffling code, and including the steps of:
    dividing the code into a plurality of sub-portions;
    identifying sub-portions of the code that can be bit-shuffled prior to processing; and
    bit-shuffling the said identified sub-portions prior to processing so as to reduce the processing bit-shuffling required.

2. A method as claimed in claim 1 wherein the said system comprises a run-time operating system and the said identified sub-portions are bit-shuffled prior to run-time.

3. A method as claimed in claim 2, and including the step of, at link time, generating a relocation patch-up table for the loading and relocation of the code.

4. A method as claimed in claim 3, and including the step of examining the relocation patch-up table at the end of the aforesaid linking so as, to determine which addresses in the code are patched.

5. A method as claimed in claim 2, wherein the said identified subportions are bit-shuffled at link time.

6. A method as claimed in claim 2, and including the step of generating a record of the sub-portions to be patched and shuffled at run-time in the form of a bitmap.

7. A method as claimed in claim 6, and including the step of adding the said bitmap to the executable code.

8. A method as claimed in claim 2, and including the steps of identifying sub-portions of the code that do not require patching at run-time in order to identify the sub-portions for pre-shuffling.

9. A method as claimed in claim 2, and including the step of reading code elements within a program loader for the execution of the program.

10. A method as claimed in claim 9, wherein the program loader is arranged to read the relocation patch-up table and the executable code and writes the result back within the executable code.

11. A method as claimed in claim 2, wherein the executable code comprises a TriMedia program having a text segment containing TriMedia executable code.

12. A method as claimed in claim 2, wherein each sub-portion of code comprises a cache-sized block.

13. A method as claimed in claim 12, wherein each cache-sized block comprises a 64 byte block.

14. A method as claimed in claim 2 and for use with any form of TriMedia executable image requiring loading and relocation before execution.

15. A method as claimed in claim 1, and including the linking of pre-shuffled code during a later link time phase.

16. Decoding apparatus for decoding executable code in a processor and including means for bit-shuffling code, the apparatus further comprising:
means for dividing the code into a plurality of sub-portions;
means for identifying sub-portions of the code that can be bit-shuffled prior to processing; and
means for bit-shuffling the said identified sub-portions prior to processing so as to reduce the processing bit-shuffling required.

17. Apparatus as claimed in claim 16 wherein the said system comprises a run-time operating system and the sub portions identified are those that can be bit-shuffled prior to run time.

18. Apparatus as claimed in claim 17, and including means for generating a relocation patch-up table for the loading and relocation of the code at link time.

19. Apparatus as claimed in claim 17, and including means for bitshuffling the identified sub-portions at link time.

20. Apparatus as claimed in claim 17, and including means for generating a record of the sub-portions to be patched and shuffled at run-time in the form of a bitmap.

21. Apparatus as claimed in claim 17, and including a program loader into which code elements are read for program execution.

22. Apparatus as claimed in claim 21, wherein the program loader is arranged to read the relocation patch-up table and the executable code and to write the result back within the executable code.

23. Apparatus as claimed in claim 17, wherein each sub-portion of code comprises a cache-sized block.

24. Apparatus as claimed in claim 17, wherein each cache-sized block comprises a 64 byte block.

25. Apparatus as claimed in claim 16 and arranged for linking pre-shuffled code during a later link time phase.

26. A computer readable medium including a computer program element comprising computer program code means to make a computer execute procedure to decode executable code in a processor including bit-shuffling code, and to:
divide the code into a plurality of sub-portions;
identify sub-portions of the code that can be bit-shuffled prior to processing; and
bit-shuffle the said identified sub-portions prior to processing so as to reduce the processing bit-shuffling required.

27. A complete program element as claimed in claim 26 and arranged to control decoding in a run-time operating system.

28. A computer program element as claimed in claim 26 and arranged to control the linking of pre-shuffled code during a later link time phase.

29. A computer program product comprising a computer readable medium and including a program element as claimed in claim 26.

* * * * *